United States Patent [19]

Bansard

[11] Patent Number: 5,325,282
[45] Date of Patent: Jun. 28, 1994

[54] LOW VOLTAGE-TO-HIGH VOLTAGE CONVERTER

[75] Inventor: Joël Bansard, La Ferte St Aubin, France

[73] Assignee: Thomson-Brandt Armements, Boulogne Billancourt, France

[21] Appl. No.: 807,857
[22] PCT Filed: May 21, 1991
[86] PCT No.: PCT/FR91/00408
§ 371 Date: Jan. 17, 1992
§ 102(e) Date: Jan. 17, 1992

[30] Foreign Application Priority Data

May 22, 1990 [FR] France ............................ 90 06389

[51] Int. Cl.⁵ .......................................... H02M 3/335
[52] U.S. Cl. ...................................... 363/21; 363/97
[58] Field of Search .................... 363/20, 21, 95, 97, 363/131

[56] References Cited

U.S. PATENT DOCUMENTS

| | | | |
|---|---|---|---|
| 3,916,281 | 10/1975 | Owen | 321/2 |
| 4,420,804 | 12/1983 | Nishino | 363/21 |
| 4,890,210 | 12/1989 | Myers | 363/21 |
| 5,021,620 | 6/1991 | Inumada | 363/97 |
| 5,021,719 | 6/1991 | Arai et al. | 315/364 |
| 5,180,882 | 1/1993 | Bansard | 102/216 |
| 5,189,599 | 2/1993 | Messman | 363/21 |

OTHER PUBLICATIONS

IEEE Transactions on Nuclear Science. vol. NS-29, No. 1, Feb. 1982, New York US pp. 217-220; Droege, Wesson & Yost: "A Compact Modular High Voltage System for Phototude and MWPC Applications".

*Primary Examiner*—R. Skudy
*Assistant Examiner*—Matthew Nguyen
*Attorney, Agent, or Firm*—Oblon, Spivak, McClelland, Maier & Neustadt

[57] ABSTRACT

The invention concerns a low voltage-to-high voltage converter of the flyback type. The converter includes a transformer whose primary winding is linked to a supply voltage source via a switch and whose secondary winding is linked to the terminals of a capacitor via a rectifier diode. This converter includes, in a conventional manner, a secondary regulation loop which compares the output voltage appearing at the terminals of the capacitor, via a divider bridge, with a reference voltage in order to regulate the OFF time of the switch. Provision is made to maintain constant the primary energy accumulated in the transformer and the total charge time of the capacitor, regardless of the value of the supply voltage. Digital regulation of an open loop system is employed to control the ON time of the switch on the basis of the value of the supply voltage and the temperature of the converter. The invention finds particular utility in high-energy projectile firing systems.

6 Claims, 4 Drawing Sheets

LOW VOLTAGE-TO-HIGH VOLTAGE CONVERTER

BACKGROUND OF THE INVENTION

The present invention relates to a low voltage-high voltage converter of the flyback type.

In many cases where only a source of low voltage is available, for example in the case where equipment is airborne, a high-voltage supply may nevertheless be required. This is the case, for example, for munitions in which the firing is done by an igniter which, for firing, requires a current pulse of large amplitude delivered in a very short time (for example, a current of 3 to 5 kA in a time between 0.1 and 0.5 $\mu$s). In that case, a high-voltage supply system is required, charging an energy reservoir such as a capacitor which must then be discharged very quickly, for example by means of a static commutator such as a controlled discharger.

In order to produce this high voltage and to charge the capacitor, a low voltage-high voltage converter is used, which converts the on-board voltage into high voltage. For reasons of practicability of the transformer of the converter, that is to say in order to be able to use an easily producible transformer ratio, as will be seen in more detail in the rest of the description, it has appeared to be necessary to utilized a low voltage-high voltage converter of the flyback type. This type of converter profits from the overvoltage obtained when the primary circuit of the transformer is opened with the aid of a switch.

The principle of these converters is that energy is accumulated in the magnetic core of the transformer during the whole of the time $T_{on}$ when the switch in the primary circuit is closed and that this energy is recovered in the secondary circuit in order to charge a capacitor during the time $T_{off}$ when the switch is open.

In most of the known convertors of this type, the on time $T_{on}$ of the switch is constant and the off time $T_{off}$ is modulated with the aid of a secondary regulation loop which operates by comparing the output voltage obtained with a reference value.

However, despite its advantages, a converter of this type presents problems in production when the low-voltage supply voltage can vary within wide limits, as is particularly the case when the source of energy is a cell or a battery which supplies a widely variable voltage according to its more or less discharged state. In fact, in this case, as the time $T_{on}$ is constant in principle, the primary energy accumulated varies in large proportions and thus also the charge time of the capacitor on each cycle. This thus leads to an unfavourable sizing of the converter which must be adapted to a maximum charge time when the supply voltage is a minimum, the component stressed the most being the transformer for which it is also necessary to avoid reaching saturation when the supply voltage is at its maximum value.

To overcome this drawback, it has been proposed in the patent U.S. Pat. No. 3,916,281 to make such a converter work with a constant primary energy accumulated in the transformer during each ON time $T_{on}$. For that reason, the patent mentioned above proposes to regulate this ON time as a function of the primary current flowing in the primary winding of the transformer. This mode of regulation permits the transformer to work substantially within rated conditions whatever the value of the supply voltage.

However, especially in the case of the utilization of the high voltage for the firing of ammunition, it can be very important that the charge time of the energy reservoir capacitor is perfectly constant and known in advance whatever the values of parameters such as the actual supply voltage or the temperature, in particular for reasons of safety.

Moreover, in such an application where it is necessary not to create high current demands on the supply which is common to several equipments of various kinds, the transformer is required to have a low inductance. That gives rise to very short $T_{on}$ times (for example, of the order of a microsecond or even less). Thus, if a closed-loop servocontrol system is used on the primary current, it is necessary to provide, in order to set up the loop, electronics (operational amplifier, etc.) with high performance levels in terms of speed. This entails complex equipment which is awkward to implement and thus costly.

SUMMARY OF THE INVENTION

A first subject of the invention is thus a low voltage-high voltage converter which meets these requirements and which is simple and inexpensive to manufacture by virtue of the utilization of a digital device operating in open loop.

Another subject of the invention is a converter controlled by a digital microcontroller.

According to a first aspect of the invention, there is provided a low voltage-high voltage converter of the flyback type, comprising a transformer of low inductance whose primary is linked via a switch to a source of supply voltage $U_A$ and whose secondary is linked to the terminals of a capacitor via a rectifier diode, the converter comprising, moreover, means of secondary regulation, which compare the output voltage at the terminals of the capacitor with a first reference voltage, and means of primary regulation which regulate the ON time $T_{on}$ of the switch so as to keep the primary energy accumulated in the transformer during each ON time $T_{on}$ substantially constant, said converter being characterized in that it comprises means for digital control regulation in open loop of the ON and OFF times of the switch on basis of data supplied by the said means of primary and secondary regulation, such that the total charge time of the capacitor up to said reference voltage is equal to a fixed, predetermined value.

Moreover, one of the problems encountered when a low voltage-high voltage converter is utilized in an environment comprising other electrical equipments is the reduction of electromagnetic interference. In point of fact, such a converter works by commutation of the supply current and thus gives rise to the appearance of powerful interference. One solution to this problem consists of carrying out input filtering on the supply of the converter. Unfortunately, the known converters are regulated in such a way that the ON time $T_{on}$ and the OFF time $T_{off}$ of the commutators vary as a function of the parameters and lead to chopper frequencies which are variable within wide limits. This renders the filtering difficult and complex.

The invention thus proposes, moreover, to control the regulation of the converter in such a way that the chopper frequency is substantially fixed and predetermined. It is clear that the filtering will thus be very much simplified since a narrow-band filter centred on the predetermined frequencies will be sufficient.

According to another aspect of the invention, there is thus provided a low voltage-high voltage converter of the type indicated above, in which said means of digital control comprises principally a microcontroller, characterised in that the said microcontroller comprises time-interval generator means to determine the final control values $T_{on}$ and $T_{off}$ such that the chopper period applied to the said switch is substantially constant.

BRIEF DESCRIPTION OF THE DRAWINGS

The invention will be better understood and other characteristics and advantages will become apparent with the aid of the description below and the attached drawings, in which.

DETAILED DESCRIPTION OF THE INVENTION

Figure 1:
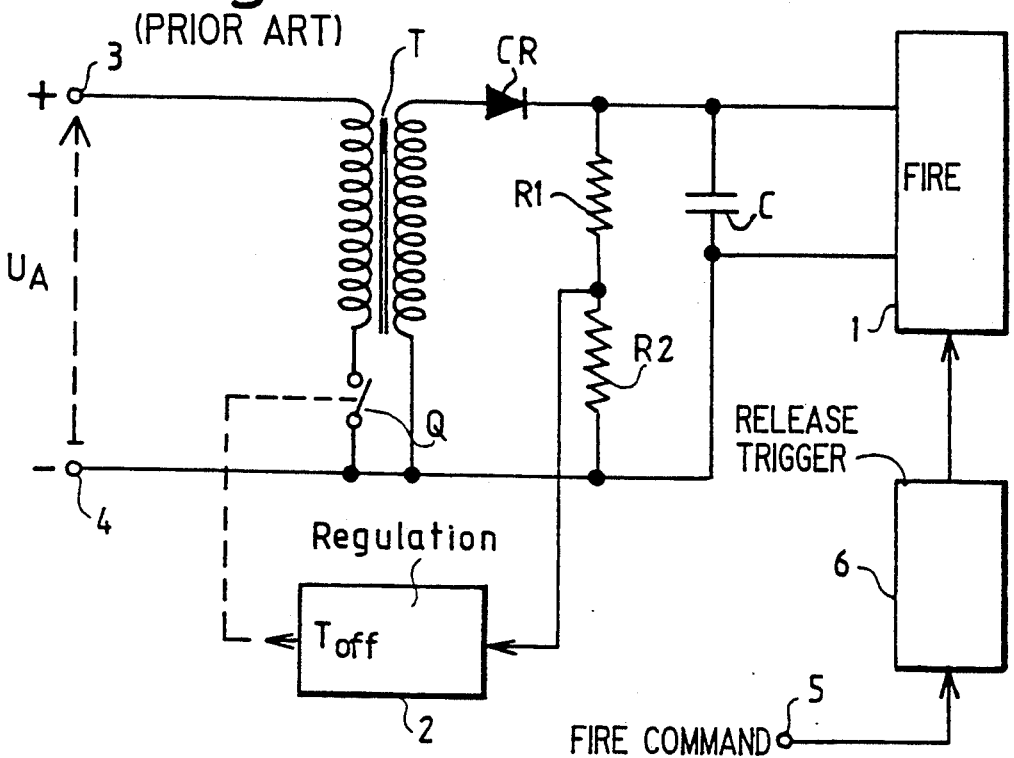
FIG. 1 represents the diagram of a low voltage-high voltage converter of the known flyback type applied to firing by a high-energy igniter.

In FIG. 1 is represented the diagram of a known converter of flyback type ("flyback") for a firing command by a high-energy igniter.

On-board the munition, a source of low-voltage supply $U_A$ is available. It is desired to supply to an "igniter" firing device 1 a current of the order of 3 to 5 kA for a very short time from an energy reservoir capacitor C charged to a high voltage, for example between 2 and 4 kV. The firing device is, for example, constituted by an igniter connected to the terminals of the capacitor by a static switch formed by a discharger controlled by a triggering circuit 6 receiving the order to fire applied to the terminal 5.

In order to charge the capacitor C to a high voltage, a flyback converter is thus utilized, comprising a transformer T whose primary winding is linked to the terminals 3, 4 for application of the supply voltage $U_A$ via a switch Q represented schematically but which can be constituted, for example, by a transistor. The secondary winding of the transformer T is linked to the terminals of the capacitor C via a rectifier diode CR. A resistor divider bridge R1, R2 is connected in parallel to the terminals of the capacitor C in order to extract a voltage proportional to the output voltage on the terminals of C. This proportional voltage is supplied to a secondary regulation loop 2 which compares it with a reference value and in consequence regulates the OFF time $T_{off}$ of the switch Q. The operation is as follows.

An output voltage is desired which is equal at least to the reference value for the lowest supply voltage. In conventional converters of direct type, a transformer ratio of the order of 200 would be necessary if the minimum supply voltage is 15 V, which is very difficult to produce. Thus, a flyback converter has been chosen, utilizing the primary overvoltage obtained when the switch Q is opened very quickly. As this overvoltage is capable of attaining some hundreds of volts, a transformer ratio of the order of a few tens can be sufficient, which is much more easily producible.

During the closure of the switch Q, the primary current permits the primary energy $E_p$ to accumulate in the magnetic core of the transformer T:

$$E_p = \tfrac{1}{2} L_p I^2_{max}$$

where $L_p$ is the inductance of the primary and $I_{max}$ is the maximum value attained by the primary current. At the instant of opening of the switch Q, a voltage $$E = -\frac{d\Phi}{dt}$$

is generated where the flux $\Phi$ is proportional to the current. It is necessary that dt should be as small as possible (of the order of a few tens of nanoseconds). The voltage $E \times n$, where n is the transformer ratio, then appears at the secondary. This voltage is rectified by the diode CR.

By the principle of such a flyback converter, the ON time $T_{on}$ during which the energy $E_p$ is accumulated is constant and the OFF time $T_{off}$ of the switch is modulated with the aid of the secondary regulation loop.

This modulation can be of the all-or-nothing type by comparing the voltage of the potentiometric divider with a reference value, which permits a particularly simple embodiment.

However, the energy $E_p$ accumulated during a constant ON time $T_{on}$ varies greatly as a function of the value $I_{max}$ which itself depends on the value of $T_{on}$ and on the value of the supply voltage $U_A$.

This gives rise to the obligation to take care not to attain saturation of the transformer T when the supply voltage is at its maximum value.

Figure 2:
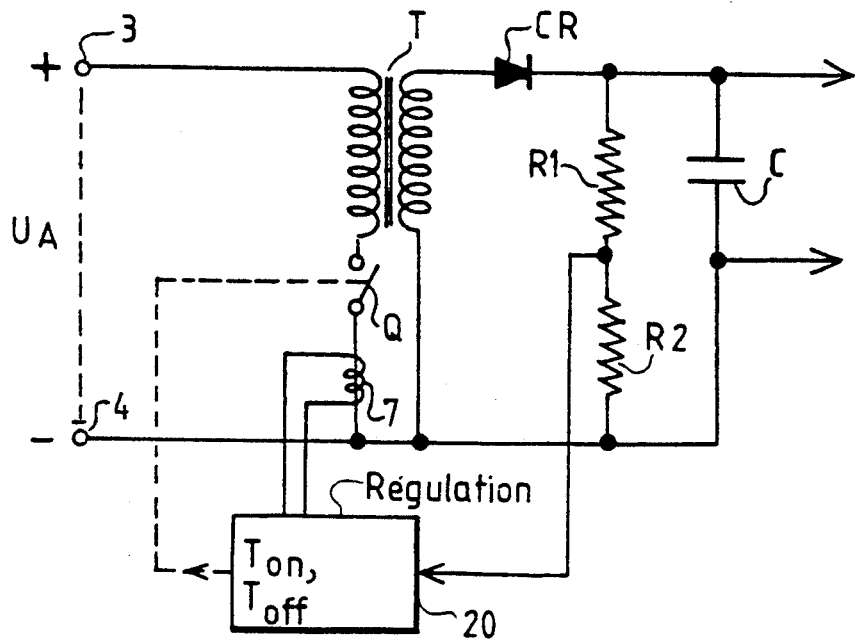
FIG. 2 is the outline diagram of a first variant of a converter, improved according to a known principle.

In FIG. 2 is represented the diagram of a flyback converter which operates with constant primary energy $E_p$ such that the transformer T always operates within rated conditions, which enables it to be optimized. In the diagram of FIG. 2, this result is obtained by providing a primary regulation loop based on servocontrol of the current $I_{max}$.

For that reason, a current sensor 7 is provided in the primary circuit 7 and the value of the ON time $T_{on}$ is regulated in order to have $I_{max}$ constant, and thus the accumulated primary energy constant, by virtue of a regulation device 20.

Figure 3:
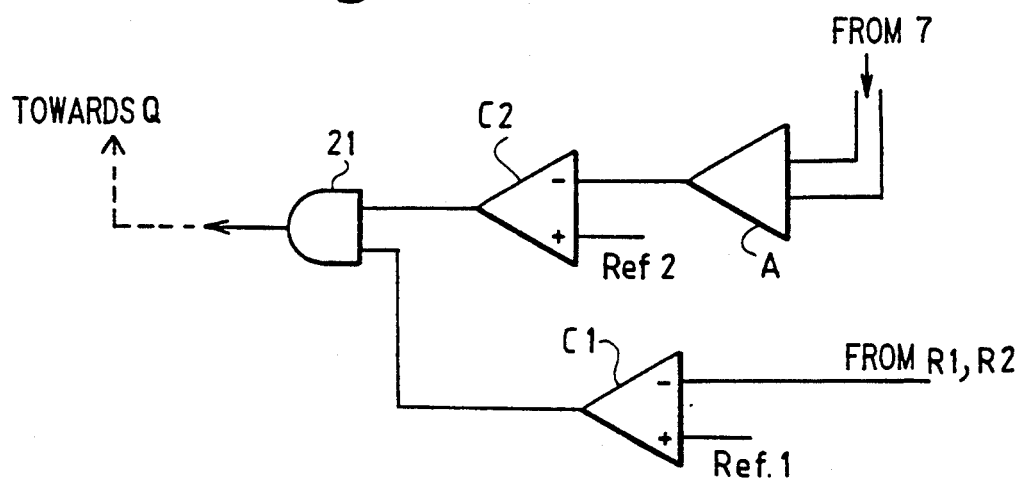
FIG. 3 shows the detailed diagram of the regulation loops of the converter of FIG. 2.

This device is represented in more detail in FIG. 3. The output of the sensor 7 is sent to an amplifier A to increase the signal dynamics. The output of the amplifier A is applied to one input of a comparator C2 whose other input receives a reference voltage Ref 2. The output of the comparator C2 which supplies a logic signal which is high or low according to whether the primary current I is lower or higher than a predetermined reference value is linked to a first input of a gate ET 21.

The signal coming from the divider bridge R1, R2 is applied to a comparator C1 which also receives a reference voltage Ref 1. The output of this comparator which also supplies a logic signal is linked to the other input of the gate ET 21. The output signal from the gate ET controls the switch Q.

As long as the voltage at the terminals of the capacitor C is higher than the reference value, the voltage of the divider R1, R2 is higher than Ref 1 and the comparator C1 supplies a low-level signal which turns off the gate ET 21. The switch Q then remains constantly in an off position and the converter consumes no supply current. As soon as the voltage of the divider falls below the reference voltage, the high-level signal from C1 turns on the gate ET 21 which then enables the primary regulation loop to function. The switch Q will close until the current I attains the reference value $I_{max}$, at which instant the comparator C2 rapidly turns of the switch Q. The regulation will continue until the voltage at the terminals of C again becomes higher than the chosen predetermined value.

Thus this is a very simple converter giving good regulation whatever the supply voltage $U_A$ and without the need to carry out prior regulation of $U_A$, a source of significant drawbacks and of further complexity.

However, this type of converter, as has already been explained, can have certain drawbacks when it is desired to use it for a device for firing by a high-energy igniter. On one hand the total charge time of the capacitor varies appreciably, as a function of the value of the supply voltage and of the temperature, which is very awkward from the point of view of safety of utilization. In fact, this variable time forces an increase in the safety distance at which the munition concerned can be in the armed state, and thus augments the minimum interception distance. On the other hand, in this type of application, it is necessary that the transformer should have a low inductance, and thus very short ON times for the switch, which, for the electronics utilized with the closed servocontrol loops, implies very high performance levels and complex and delicate implementation.

Figure 4:
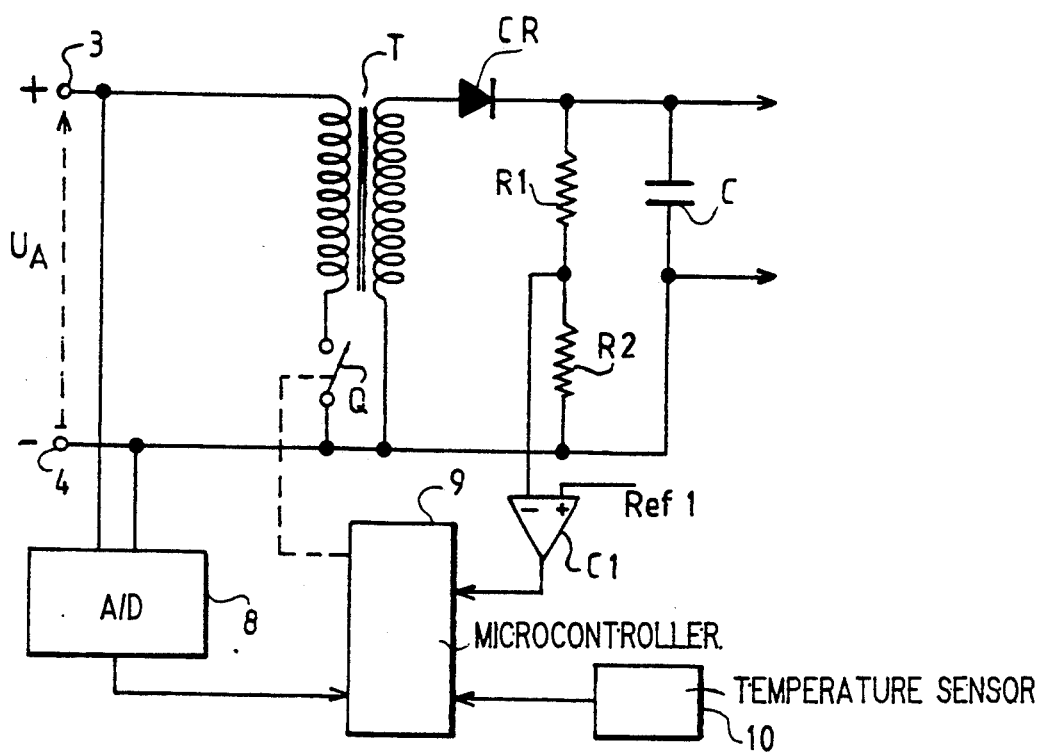
FIG. 4 is the outline diagram of a converter according to the invention.

FIG. 4 illustrates the principle of the invention according to which operation is obtained with primary energy $E_p$ substantially constant by slaving the ON time $T_{on}$ of the switch Q to the value of the supply voltage $U_A$ by means of an open-loop device. In order to do this, it is possible to adopt analog or digital methods. The analog methods, while practicable, are more complex in execution by reason especially of the temperature drifts of the components. Thus, in FIG. 4 is represented the diagram of an apparatus employing a digital method.

The supply voltage $U_A$ is picked off directly at the input to the flyback converter and is converted into a digital value by an analog-digital converter 8. This digital value of $U_A$ and the logic signal supplied by the comparator C1 of the secondary regulation loop are sent to a microcontroller 9. The latter, on the basis of the signals that it receives, supplies the optimized control values for the switch Q. One very simple method of producing the microcontroller 9 is to use a memory, for example of read-only memory type, in which are stored the optimal values of $T_{on}$ for each value of $U_A$, and to address this memory by the value of $U_A$ supplied by the converter 8. The great advantage of such a structure is that addressing of the memory can be provided as a function of complementary parameters, such as the temperature measured by a sensor 10.

The values stored in the memory can also be determined in advance by analyzing the behavior of the converter in a phase of learning, and then programming of the memory, permitting account to be taken of the imprecisions in the elements of the converter and the drifts.

Such a solution has the advantage of being very inexpensive as it does not necessitate precision components, can be integrated and uses a transformer constantly within rated conditions.

Figure 5:
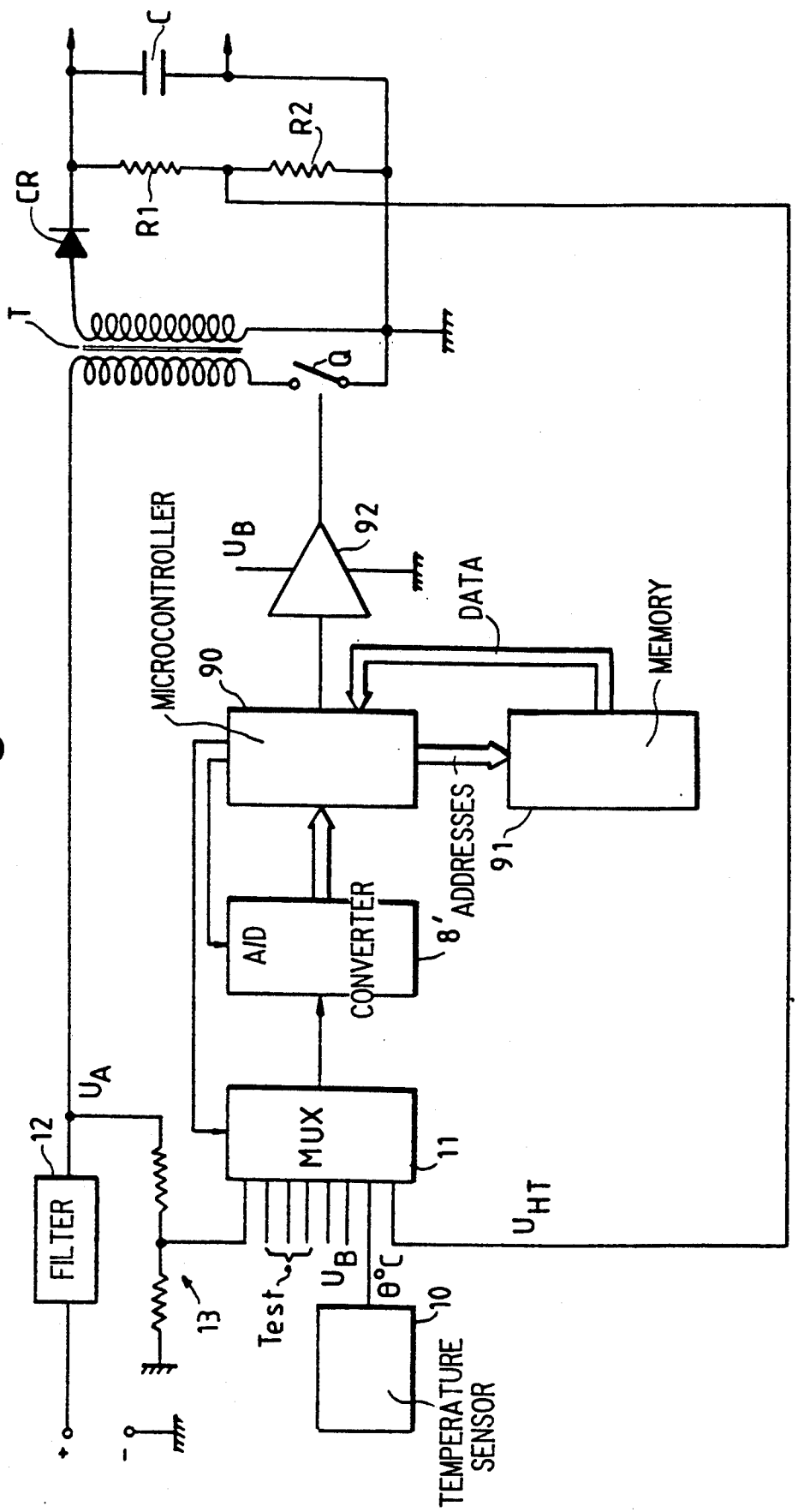
FIG. 5 is a diagram of an embodiment of a converter according to the invention.

FIG. 5 shows the diagram of a particularly advantageous embodiment according to the foregoing principle.

The same elements as in the preceding figures are designated by the same references. As well as the principal components of the converter (transformer T, switch Q, diode CR, capacitor C, resistor bridge R1, R2), means of digital control are provided. These means of control comprise a multiplexer 11 whose output is linked to an analog-digital converter 8' itself linked to a microcontroller 90. This microcontroller is associated with a read-only memory 91, of the EEPROM type for preference, and its output supplies the ON and OFF control signals to the switch Q via a buffer stage 92 receiving a supply voltage $U_B$.

The multiplexer 11 receives at its inputs, firstly a voltage proportional to the supply voltage $U_A$ via a divider bridge 13, secondly a voltage $U_{HT}$ proportional to the high output voltage via the divider bridge R1, R2, and finally a measurement of the temperature $\theta$ provided by the temperature sensor 10. The multiplexer 11 also comprises other inputs which do not directly concern the invention but are provided to receive fabrication values which the microcontroller monitors during fabrication (voltages such as $U_B$, test values, etc.).

As far as the data involved in the invention and set out above are concerned, the multiplexer 11 permits their sequential application to the analog-digital convertor 8' which encodes them and converts then successively into digital data. These data are sent to the microcontroller 90 which utilizes them to address the memory 91. The latter contains tables of values of ON times $T_{on}$ for the switch Q which have been predetermined as a function of the supply voltage $U_A$ and of the temperature $\theta$ so as to ensure a total charge time $T_C$ of the capacitor C to the high voltage wanted, which is constant. As has been seen, this is important for the effectiveness of a munition using such a converter.

The advantages of such a device are evident: operating in open loop, it needs no loop components of high performance; it is entirely digital, it is extremely simple to produce and to implement as it requires only a small number of components of low precision, the device being itself capable of compensating for deviations during a learning phase; and it is very flexible as it permits the programming of the system while modifying the parameters written into the memory. Moreover, this device permits supplementary parameters such as temperature to be taken into account.

As has already been mentioned, it is important, moreover, not to create electromagnetic disturbances, which upset equipments situated close by. In point of fact, the converter described is a chopper device and it is therefore essential to arrange at the input, on the supply voltage, a filter 12 to eliminate interference at the chopper frequency.

However, in known converters, this frequency is essentially variable as d function of the various parameters. This gives rise to the need for relatively complex filters.

According to another aspect of the invention, the ON and OFF times of the switch Q are determined so as to provide, in addition, a constant chopper period for a given temperature, the period varying only when the temperature varies, but then only by a small proportion. The great advantage is that it is then possible to utilize filter 12 with a narrow band determined in advance by the characteristics of the converter. For that reason, as the ON time $T_{on}$ varies as a function of the parameters $U_A$ and $\theta$, it is necessary to vary the OFF time $T_{off}$ concomitantly, in order to obtain a constant sum $T_{on} + T_{off}$.

Figure 7:
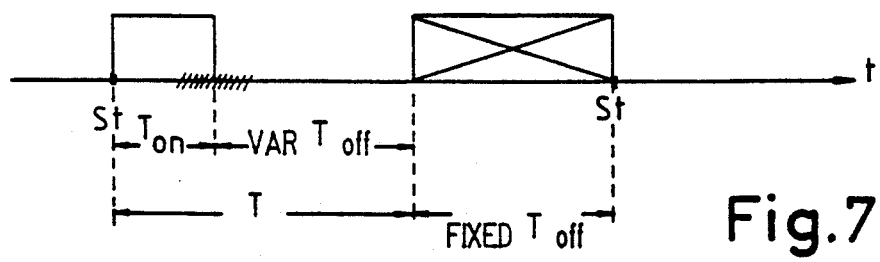
FIG. 7 represents a diagram explaining the operation of the converter according to the invention.

FIG. 7 is a diagram as a function of time illustrating the chosen solution, without that being limiting in nature. In order to encode the data on supply voltage, temperature and voltage $U_{HT}$, the multiplexer 11 and the converter 8' require (for each period) a fixed time interval called "fixed $T_{off}$" since it constitutes part of the OFF time $T_{off}$ of the switch. Moreover, the time $T_{on}$ is determined as a function of the parameters and stored in the memory 91. It starts at a start time St and terminates at a variable time (indicated by a hatched area).

A predetermined time interval T is fixed which, added to the "fixed $T_{off}$" time, gives the constant chopper period wanted.

On this basis, a "variable $T_{off}$" time, which is the difference $T - T_{on}$, can then be determined.

The OFF time $T_{off}$ of the switch Q is then the sum of the variable $T_{off}$ and fixed $T_{off}$ times. The chopper period between two successive signals St is thus held constant, whatever value of $T_{on}$ is chosen by the memory 91 and the microcontroller 90.

As the time T is in fact variable (in small proportions) with temperature, it is stored like the time $T_{on}$ in the memory 91. Thus, the memory 91 is organized as follows. It contains tables of values of $T_{on}$. Each table is addressed by address bits corresponding to the temperature $\theta$ (for example, high-order bits of the address). Within each table, one particular value of $T_{on}$ is addressed by the address bits (low-order bits) corresponding to the value of the supply voltage $U_A$. One defined value of T is associated with each table, that is to say with each temperature.

Figure 6:
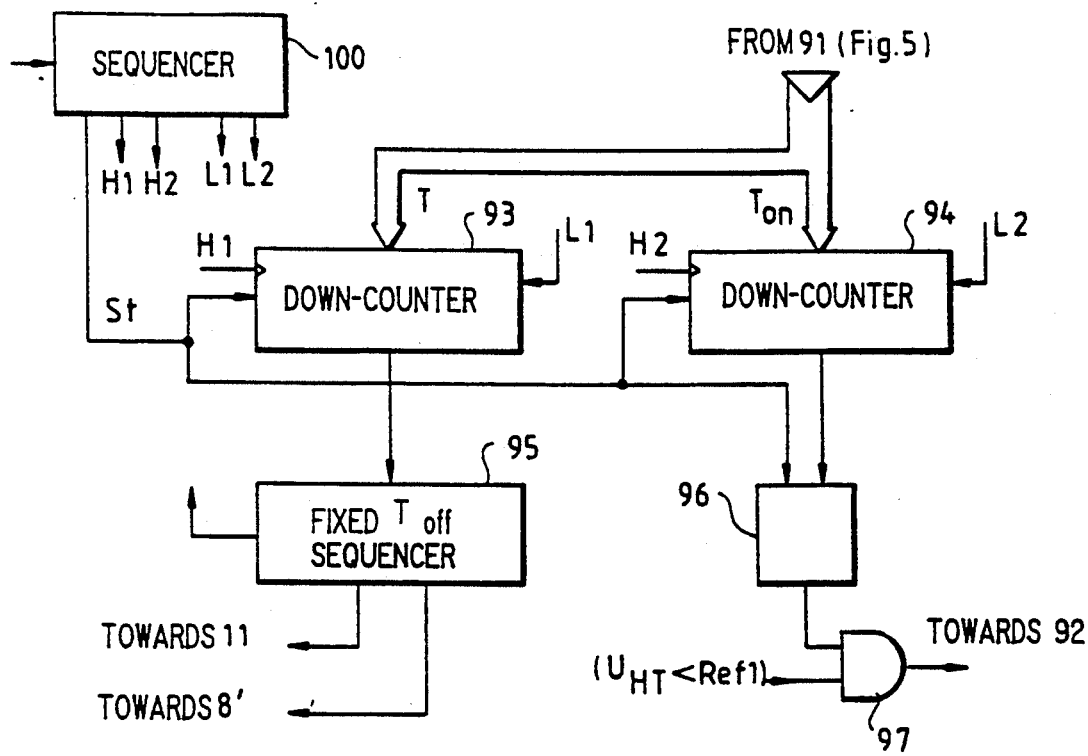
FIG. 6 shows the detailed functional diagram of a part of the converter of FIG. 5.

This being so, FIG. 6 shows how the part of the microcontroller 90 which has to produce the control signals $T_{on}$ and $T_{off}$ for the switch Q can be represented in operational terms.

The data item $T_{on}$ read in the memory 91 is loaded into a down-counter 94 while the data item T is loaded into a down-counter 93. The down-counters 93 and 94 receive respectively clock signals H1 and H2 and the loading signals ("Load") L1 and L2.

A general sequencer 100 supplies these various signals and the start pulses St at the defined chopper frequency. A bistable flip-flop 96 is controlled on the one hand by the pulses St and on the other hand by the end-of-countdown signals from the down-counter 94. The output signal of the flip-flop 96 is applied to a gate ET 97 whose other input receives the governing signal indicating that the voltage $U_{HT}$ received by the microcontroller 90 in digital form is less than the reference voltage. Finally, a sequencer "fixed $T_{off}$" 95 receives the end-of-countdown signal from the down-counter 93 and supplies control signals to the multiplexer 11 and to the converter 8', and synchronization pulses to the sequencer 100.

The operation is as follows. The sequencer 100 having controlled the loading of the actual values T and $T_{on}$ coming from the memory 91 into the down-counters 93 and 94 then supplies a start signal St which governs the countdown by the two down-counters and which causes the flip-flop 96 to pass to a high state. The down-counter 94 counts down during a time interval equal to $T_{on}$, at the end of which it supplies a signal resetting the flip-flop 96 to the low level. The flip-flop 96 thus delivers a pulse of duration $T_{on}$. This pulse is transmitted, as a control signal to turn on the switch Q, towards the buffer stage 92 via the gate 97 if the governing signal is present, that is to say if the high output voltage has not yet reached the desired value.

During this time, the down-counter 93 also counts down. At the end of a time T after the signal St, the down-counter 93 supplies a start signal to the sequencer 95. The latter then delivers the necessary control signals to the multiplexer 11 and to the converter 8' so that they will supply the digitized data on supply voltage $U_A$, temperature $\theta$ a voltage $U_{HT}$ during the "fixed $T_{off}$" interval. At the end of this interval, the sequencer 95 supplies a synchronization signal to the general sequencer 100 which then generates a new start signal St for a new chopper period.

It is quite clear that such means of digital control permit great flexibility of operation. This can be illustrated in one particular aspect by the diagrams of FIG. 8.

Figure 8:
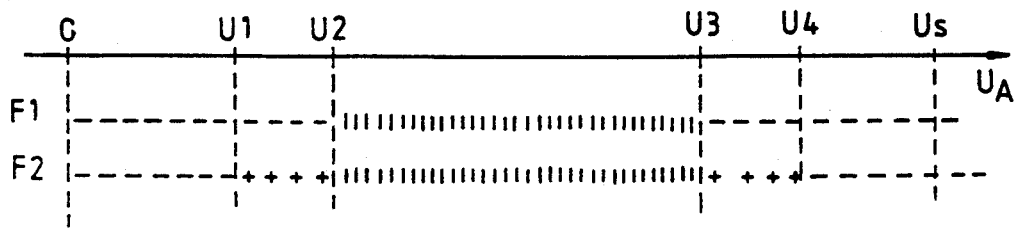
FIG. 8 is a diagram illustrating the flexibility of utilisation of the converter according to the invention.

FIG. 8 shows, on an axis of supply voltages $U_A$, different possible values for this voltage between zero and a maximum value $U_S$, beyond which the analog-digital converter 8' always delivers the same value equal to $U_S$.

In a first mode of operation F1, it can be decided that the low voltage-high voltage converter according to the invention is not authorized to operate except in rated conditions, between the values U2 and U3, this being denoted by vertical hatching. Within these limits, $T_{on}$ times can be determined which allow the total charge time of the capacitor and the rate of charge by the components of the converter to be respected. Outside these limits, the converter must not operate, which is denoted in the figure by dotted lines between 0 and U2 and beyond U3. This can be brought about by writing zeros for $T_{on}$ into the memory 91 in all the positions corresponding to values of $U_A$ outside the range U2-U3.

A greater flexibility is observed in the mode of operation F2. In this second mode, on either side of the rated region U2-U3 are defined regions of degraded but authorised operation, denoted by + signs. In these regions, the rated performance levels are no longer obtained from the converter:

in the region U1-U2, the charge time $T_C$ of the capacitor is longer than the rated value;

in the region U3-U4, a significant increase in the rate of charge by the components is noted, but judged acceptable.

It is clear the examples of embodiment described in no way limit the invention; in particular the example of embodiment of FIG. 6 can be replaced by any other type of embodiment of the microcontroller without departing from the scope of the invention.

I claim:

1. A low voltage-to-high voltage converter of a flyback type, comprising:
   a transformer of low inductance having a primary winding and a secondary winding, the primary winding of which is linked via a switch to a source of supply voltage and the secondary winding of which is linked to the terminals of a capacitor via a rectifier diode;

means for secondary regulation, which compares an output voltage at the terminals of said capacitor with a reference voltage;

means of primary regulation which regulates an amount of time that said switch is closed so as to maintain an amount of energy accumulated in said transformer during each time period in which said switch is closed substantially constant; and means for digitally regulating an open loop system that controls the duration of the time periods during which said switch is open/closed on the basis of data supplied by said means of primary regulation and by said means of secondary regulation such that the amount of time required to charge said capacitor to the level of said reference voltage is equal to a fixed, predetermined value.

2. A low voltage-to-high voltage converter according to claim 1, wherein said means for digitally regulating an open loop system comprises:

a multiplexer for receiving at its input said data supplied by said means of primary regulation which is a voltage proportional to said supply voltage, said data supplied by said means of second regulation which is a voltage proportional to an output high voltage appearing at the terminals of said capacitor, and data representing a measurement of the temperature of said converter, said multiplexer multiplexing all data received at its inputs;

an analog-to-digital converter for converting data outputted from said multiplexer in analog form to digital form;

a read-only memory, the contents of which comprise values representing amounts of time during which said switch is closed corresponding to different values of supply voltage, said read-only memory being addressed by data digitized and output from said analog-to-digital converter; and a microcontroller for supplying addresses output from said analog-to-digital converter to said read-only memory and for delivering, on the basis of values read from said read-only memory, control values to said switch which control the amount of time during which said switch is open/closed.

3. A low voltage-to-high voltage converter according to claims 1 or 2, wherein said microcontroller comprises time-interval generator means for determining control values which control the amount of time during which said switch is open/closed such that constant switching periods are defined, each of which consist of the sum of the amount of time necessary to charge said capacitor to the level of said reference voltage and the amount of time during which said switch subsequently remains open prior to closing.

4. A low voltage-to-high voltage converter according to claim 3, wherein said read-only memory supplies a value representing a constant time interval for a given temperature of said converter and wherein said time-interval generator means comprises time logic means for supplying, on the basis of values received from said read-only memory, control values representing the amount of time during which said switch is open/closed, wherein the amount of time during which said switch is open consists of the sum of a first, fixed, predetermined time interval corresponding to the time necessary for said analog-digital converter to supply digitized data relating to a level of supply voltage, to a maximum output voltage appearing at the terminals of said capacitor, and to a measurement of a temperature of said converter and of a second, variable time interval which consists of the deference between said constant time interval and said amount of time during which said switch is closed.

5. A low voltage-to-high voltage converter according to claim 4, wherein said time logic means comprises:

a first down-counter and a bi-stable flip-flop for supplying, on the basis of a value representing the amount of time during which said switch is closed supplied by said read-only memory, a signal having a duration equal to the amount of time during which said switch is closed and beginning in synchronism with a start pulse;

a logic gate for transmitting said signal as the control signal representing the amount of time during which said switch is closed when said means of secondary regulation indicates that an output voltage appearing at the terminals of said capacitor is lower than said reference voltage; and a second down-counter for receiving a value representing said constant time interval and for controlling the operation of said multiplexer, said analog-digital converter, and a supply of said start pulses.

6. A low voltage-to-high voltage converter according to claims 1 or 2, wherein said means for digitally regulating an open loop system governs the operation of said converter only within a predetermined range of supply voltage values.

* * * * *